(12) United States Patent
Kothari et al.

(10) Patent No.: US 7,816,164 B2
(45) Date of Patent: Oct. 19, 2010

(54) MEMS PROCESSING

(75) Inventors: Manish Kothari, Cupertino, CA (US); Fritz Y. F. Su, Hsin Chu Country (TW); Bangalore Natarajan, Cupertino, CA (US); Nassim Khonsari, Redwood City, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 431 days.

(21) Appl. No.: 11/566,172

(22) Filed: Dec. 1, 2006

(65) Prior Publication Data

US 2008/0130082 A1 Jun. 5, 2008

(51) Int. Cl.
*H01L 21/00* (2006.01)

(52) U.S. Cl. ........................................................ 438/48
(58) Field of Classification Search .................... 438/48; 359/238
See application file for complete search history.

(56) References Cited

U.S. PATENT DOCUMENTS

| | | | |
|---|---|---|---|
| 4,036,360 A | 7/1977 | Deffeyes | |
| 4,074,480 A | 2/1978 | Burton | |
| 4,531,126 A | 7/1985 | Sadones | |
| 4,844,614 A | 7/1989 | Henderson et al. | |
| 5,244,707 A | 9/1993 | Shores | |
| 5,304,419 A | 4/1994 | Shores | |
| 5,591,379 A | 1/1997 | Shores | |
| 5,610,438 A | 3/1997 | Wallace et al. | |
| 5,614,785 A | 3/1997 | Wallace et al. | |
| 5,882,761 A | 3/1999 | Kawami et al. | |
| 5,939,785 A | 8/1999 | Klonis et al. | |
| 6,040,937 A | 3/2000 | Miles | |
| 6,261,853 B1 | 7/2001 | Howell et al. | |
| 6,445,062 B1 | 9/2002 | Honda | |
| 6,589,625 B1 | 7/2003 | Kothari et al. | |
| 6,650,455 B2 | 11/2003 | Miles | |
| 6,674,562 B1 | 1/2004 | Miles et al. | |
| 6,680,792 B2 | 1/2004 | Miles | |
| 6,791,660 B1 | 9/2004 | Hayashi et al. | |
| 7,042,643 B2 | 5/2006 | Miles | |
| 7,123,216 B1 | 10/2006 | Miles | |

(Continued)

FOREIGN PATENT DOCUMENTS

EP          0 667 548          8/1995

(Continued)

OTHER PUBLICATIONS

Keusseyan et al., A new approach for opto-electronic/MEMS packaging, Proceedings 52nd Electronic Components and Technology Conference, ECTC May 2002, pp. 259-262.

(Continued)

*Primary Examiner*—Ha Tran T Nguyen
*Assistant Examiner*—Shaun Campbell
(74) *Attorney, Agent, or Firm*—Knobbe Martens Olson & Bear LLP (57) ABSTRACT

Methods for forming a MEMS display device are provided. In one embodiment, a transparent substrate comprising an array of MEMS devices (e.g., interferometric modulators) formed thereon is annealed following removal of a sacrificial silicon layer. The array is subsequently encapsulated with a backplate comprising a desiccant. MEMS devices disposed below the desiccant have an offset voltage substantially equal to zero.

22 Claims, 10 Drawing Sheets

U.S. PATENT DOCUMENTS

| | | |
|---|---|---|
| 7,164,520 B2 | 1/2007 | Palmateer et al. |
| 7,368,803 B2 | 5/2008 | Gally et al. |
| 7,405,924 B2 | 7/2008 | Gaily et al. |
| 7,746,537 B2 | 6/2010 | Natarajan |
| 2002/0056900 A1 | 5/2002 | Liu et al. |
| 2002/0063322 A1 | 5/2002 | Robbins et al. |
| 2002/0119724 A1 | 8/2002 | Hammel |
| 2002/0126364 A1 | 9/2002 | Miles |
| 2002/0149096 A1 | 10/2002 | Liebeskind |
| 2003/0062186 A1 | 4/2003 | Boroson et al. |
| 2003/0108306 A1 | 6/2003 | Whitney et al. |
| 2003/0121418 A1 | 7/2003 | Loop et al. |
| 2003/0122137 A1 | 7/2003 | Hashimoto |
| 2003/0138656 A1 | 7/2003 | Sparks |
| 2003/0160021 A1 | 8/2003 | Platt et al. |
| 2003/0184412 A1 | 10/2003 | Gorrell |
| 2004/0051929 A1 | 3/2004 | Sampsell et al. |
| 2004/0061492 A1 | 4/2004 | Lopes et al. |
| 2004/0100677 A1 | 5/2004 | Huibers et al. |
| 2004/0115856 A1 | 6/2004 | Jung et al. |
| 2004/0122175 A1 | 6/2004 | Hekal |
| 2004/0166603 A1 | 8/2004 | Carley |
| 2004/0189195 A1 | 9/2004 | Allemand |
| 2004/0213962 A1 | 10/2004 | Bourdelais et al. |
| 2004/0259370 A1 | 12/2004 | Bergman |
| 2005/0074919 A1 | 4/2005 | Patel et al. |
| 2005/0093134 A1 | 5/2005 | Tarn |
| 2005/0247477 A1 | 11/2005 | Kothari et al. |
| 2005/0253283 A1 | 11/2005 | Dcamp et al. |
| 2005/0254115 A1* | 11/2005 | Palmateer et al. ........... 359/276 |
| 2006/0066600 A1 | 3/2006 | Palmateer |
| 2006/0066935 A1 | 3/2006 | Cummings et al. |
| 2006/0076632 A1 | 4/2006 | Palmateer et al. |
| 2006/0076637 A1 | 4/2006 | Gally |
| 2006/0077126 A1 | 4/2006 | Kothari |
| 2006/0077145 A1 | 4/2006 | Floyd |
| 2006/0077146 A1 | 4/2006 | Palmateer |
| 2006/0077147 A1 | 4/2006 | Pamateer et al. |
| 2006/0077503 A1 | 4/2006 | Palmateer et al. |
| 2007/0170568 A1 | 7/2007 | Palmateer et al. |
| 2007/0268201 A1 | 11/2007 | Sampsell |
| 2007/0268581 A1 | 11/2007 | Palmateer |
| 2008/0112036 A1 | 5/2008 | Cummings |
| 2008/0164544 A1 | 7/2008 | Palmateer et al. |

FOREIGN PATENT DOCUMENTS

| | | |
|---|---|---|
| EP | 0 969 700 | 1/2000 |
| EP | 1 251 546 | 10/2002 |
| EP | 1418154 A2 | 5/2004 |
| EP | 1 640 323 | 3/2006 |
| EP | 1 640 324 | 3/2006 |
| JP | 02-068513 | 3/1990 |
| JP | 03-199920 | 8/1991 |
| JP | 2003-217828 | 7/2003 |
| WO | WO 02/39513 | 5/2002 |
| WO | WO 02/42716 A2 | 5/2002 |
| WO | WO 03/009317 | 1/2003 |
| WO | WO 2005/110914 A1 | 11/2005 |
| WO | WO 2005/114294 A1 | 12/2005 |

OTHER PUBLICATIONS

Previti et al., Getters: micromolecular scavengers for packaging, Proceedings International Symposium on Advanced Packaging Materials Processes, Properties and Interfaces, 2001, pp. 201-206.

Moraja, et al., Advanced Getter Solutions at Wafer Level to Assure High Reliability to the last Generations MEMS, IEEE Reliability Physics Symposium Proceedings, 2003, pp. 458-459.

Sparks, et al. Chip-Level Vacuum Packaging of Micromachines Using NanoGetters, IEEE Transactions on Advanced Packaging, vol. 26 Issue 3, Aug. 2003, pp. 277-282.

ISR and WO for PCT/US07/023393 filed Nov. 8, 2007.

IPRP for PCT/US07/023393 filed Nov. 8, 2007.

* cited by examiner

MEMS PROCESSING

BACKGROUND

1. Field of the Invention

The invention relates to microelectromechanical systems (MEMS) and the packaging of such systems. More specifically, the invention relates to interferometric modulators and methods of fabricating such modulators using a desiccant.

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices described herein each have several aspects, no single one of which is solely responsible for its desirable attributes. After considering this discussion, and particularly after reading the section entitled "Detailed Description" one will understand how the features of described herein provide advantages over other display devices. Some embodiments described herein provide a package structure and a method of manufacturing a package structure in ambient conditions.

In one embodiment a method for manufacturing a microelectromechanical (MEMS) display device comprises providing a transparent substrate having an array of MEMS devices formed thereon, baking the transparent substrate under predetermined conditions to remove contaminants from the array and sealing the transparent substrate to a backplate to form a package.

In another embodiment a method for manufacturing a microelectromechanical (MEMS) display device comprises providing a transparent substrate with an array of MEMS devices formed thereon, removing voltage-changing contaminants from the array and sealing the transparent substrate to a backplate to form a package.

BRIEF DESCRIPTION OF THE DRAWINGS

These and other aspects will be readily apparent from the following description and from the appended drawings (not to scale), which are meant to illustrate and not to limit the embodiments described herein, and wherein.

DETAILED DESCRIPTION

The following detailed description is directed to certain specific embodiments. However, the devices and methods described herein can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One embodiment of the invention is a MEMS device, such as an interferometric modulator for use in a display. These types of devices are typically packaged with a backplate. In some embodiments, the backplate includes an interfering member that can prevent the MEMS device from its proper function. For example, in one embodiment, the backplate has a desiccant affixed to the backplate, and the desiccant interferes with the proper functioning of the MEMS device. In one embodiment, the desiccant material alters the electronic properties of the MEMS devices that are adjacent to the desiccant.

With regard to MEMS devices that are interferometric modulators, it has been observed that the individual interferometric modulators disposed below the desiccant interact with the desiccant under normal operating conditions. This interaction produces an offset voltage, causing the interferometric modulators disposed below the desiccant to behave differently than interferometric modulators that are not below the desiccant. The offset voltage produces a desiccant pattern that is visible during normal operation of the MEMS device. The desiccant pattern is even more pronounced at elevated operating temperatures.

In one embodiment, the invention includes processing steps that eliminate the undesired effects of a desiccant pattern in a MEMS display element. As is known, MEMS devices, such as interferometric modulators are formed on a substrate and may include a desiccant material to reduce moisture within the packaged device. In one embodiment, the MEMS device is annealed at a predetermined temperature and time to reduce the voltage offset effects of the desiccant material. The MEMS device is subsequently encapsulated by sealing a backplate to the substrate. In some embodiments, an interfering member, such as, e.g., a desiccant is provided over at least some of the MEMS devices.

While preferred embodiments are described in the context of interferometric modulators, it will be appreciated that preferred embodiments can apply to any MEMS device. As an example, while certain examples below describe interferometric modulators disposed below a desiccant, it will be appreciated that the interferometric modulators can be replaced with any MEMS device.

Figure 1:
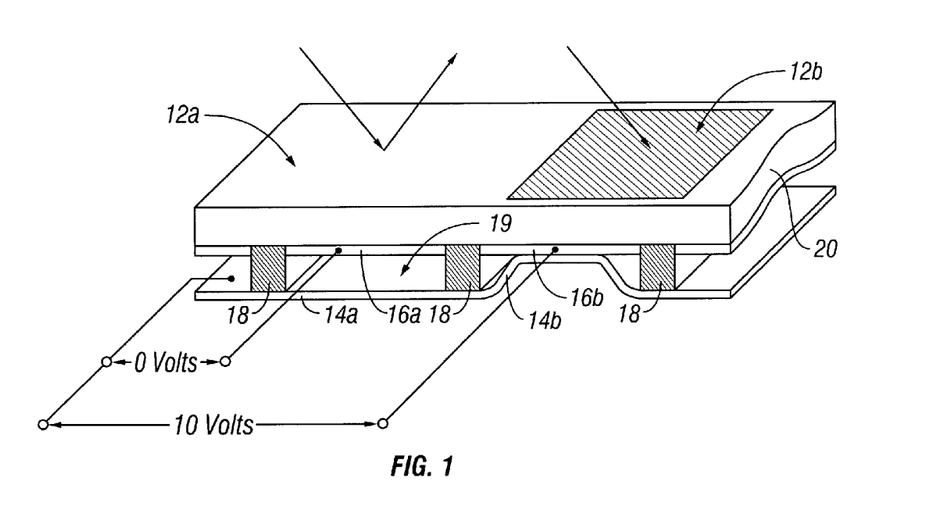
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
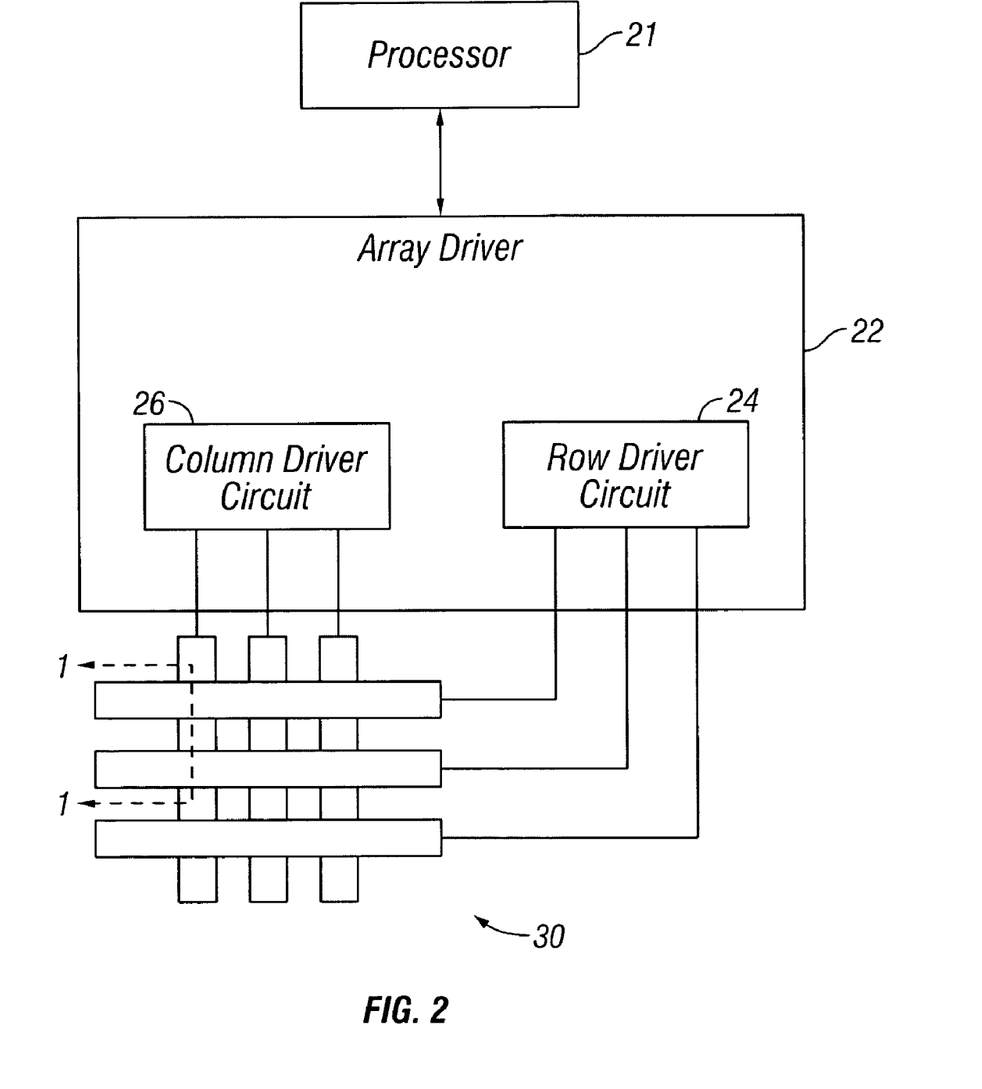
FIG. 2 is a system block diagram illustrating one embodiment of an electronic device incorporating a 3×3 interferometric modulator display.
Figure 3:
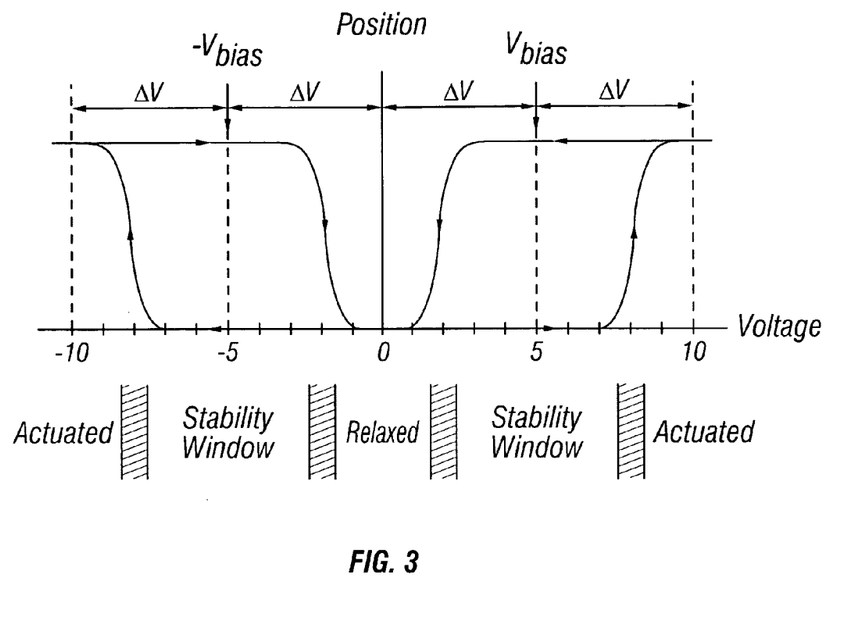
FIG. 3 is a diagram of movable mirror position versus applied voltage for one exemplary embodiment of an interferometric modulator of FIG. 1.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figure 4:
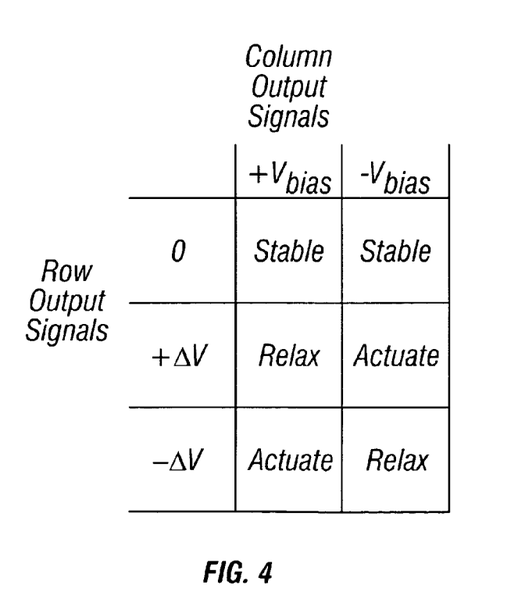
FIG. 4 is an illustration of a set of row and column voltages that may be used to drive an interferometric modulator display.
Figure 5A:
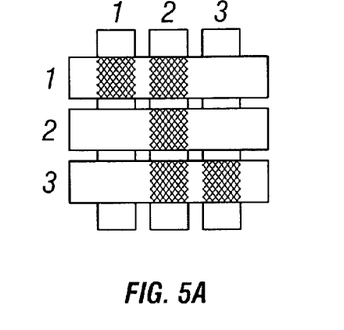
FIG. 5A illustrates one exemplary frame of display data in the 3×3 interferometric modulator display of FIG. 2.
Figure 5B:
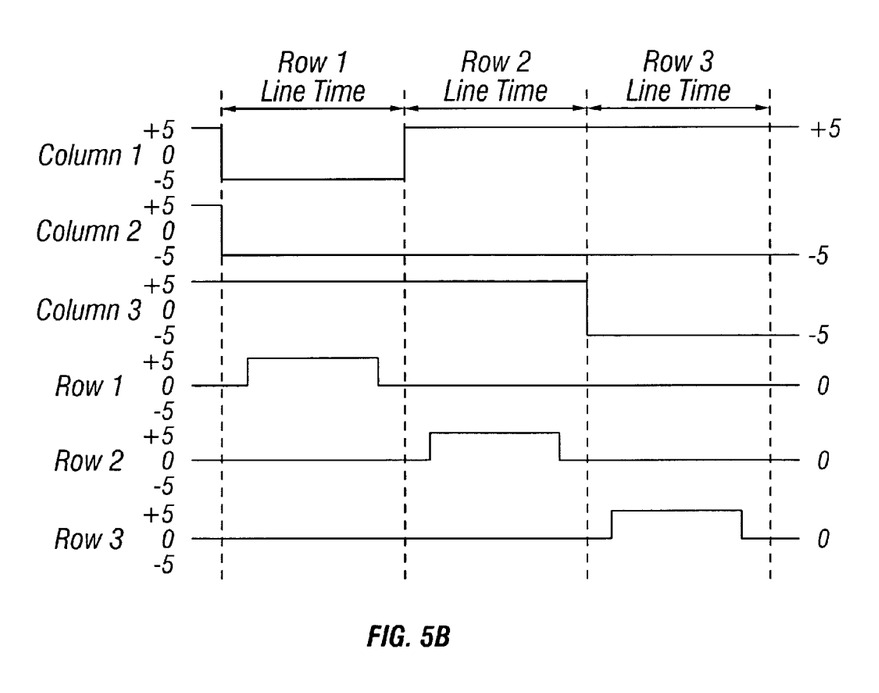
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
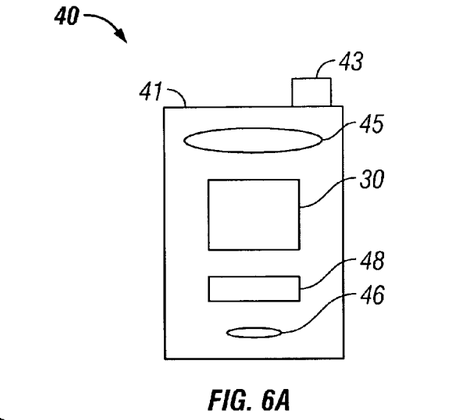
FIGS. 6A and 6B are system block diagrams illustrating an embodiment of a visual display device comprising a plurality of interferometric modulators.
Figure 6B:
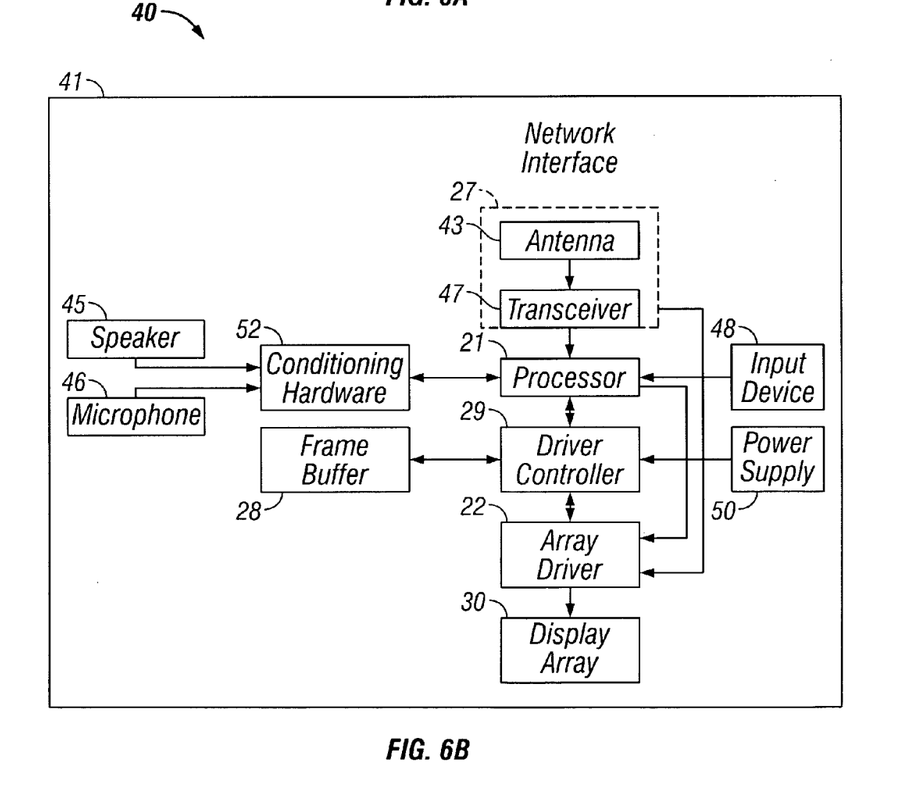

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
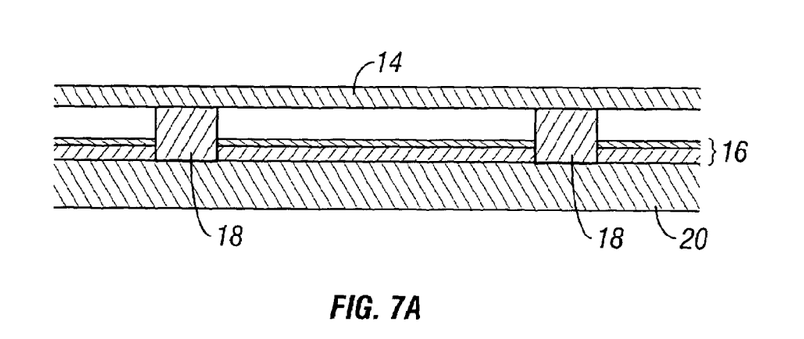
FIG. 7A is a cross section of the device of FIG. 1.
Figure 7B:
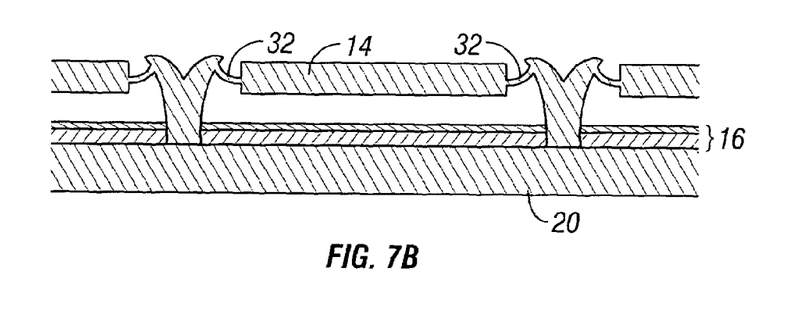
FIG. 7B is a cross section of an alternative embodiment of an interferometric modulator.
Figure 7C:
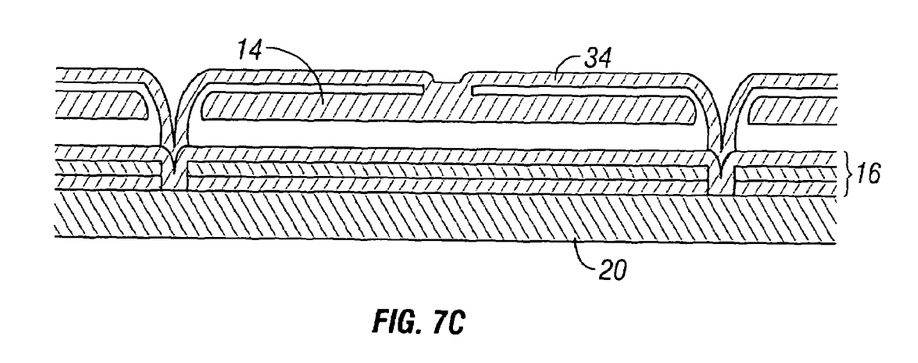
FIG. 7C is a cross section of another alternative embodiment of an interferometric modulator.
Figure 7D:
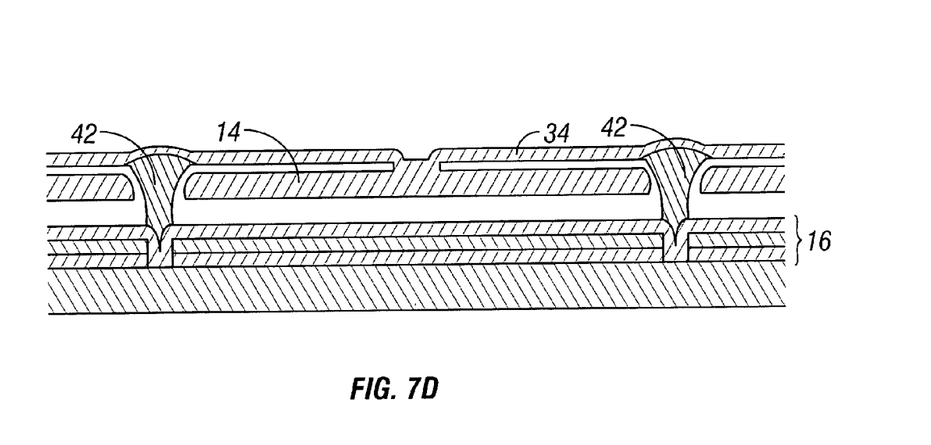
FIG. 7D is a cross section of yet another alternative embodiment of an interferometric modulator.
Figure 7E:
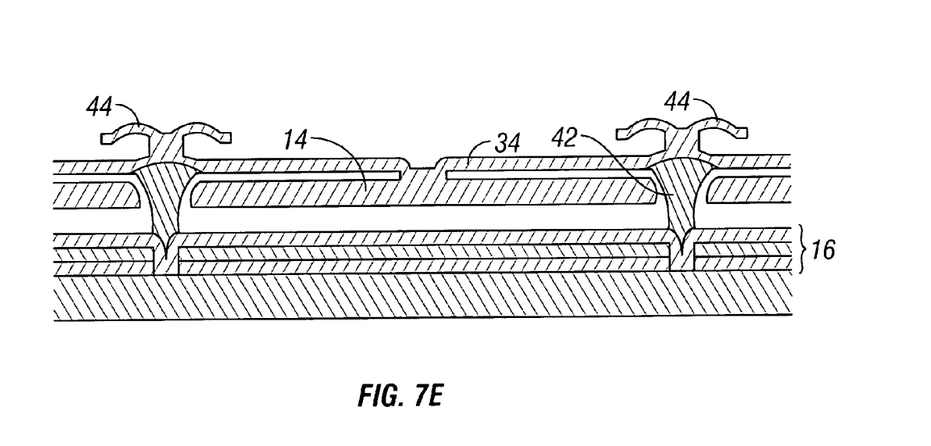
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties. The production of various types of interferometric devices is described in a variety of published documents, including, for example, U.S. Published Application 2004/0051929. A wide variety of known techniques may be used to produce the above described structures involving a series of material deposition, patterning, and etching steps.

Packaging techniques for interferometric modulators will be described in more detail below.

Packaging Techniques

Figure 8A:
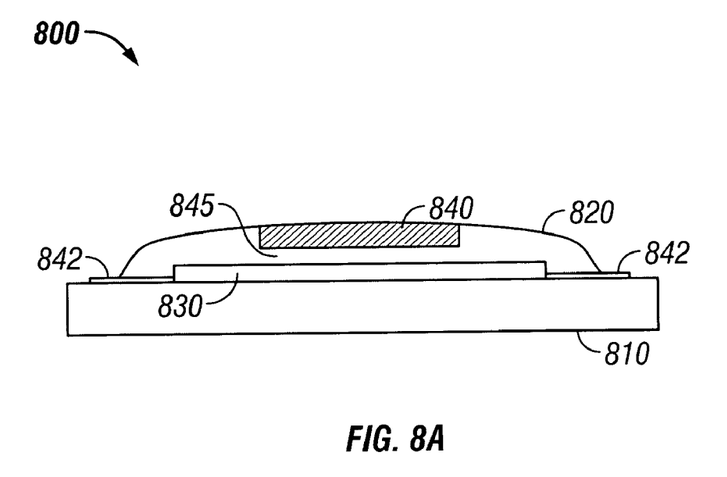
FIGS. 8A and 8B are schematic, cross-sectional side and top-plan views of a package structure having an interferometric modulator array and desiccant within the package, in accordance with a preferred embodiment.
Figure 8B:
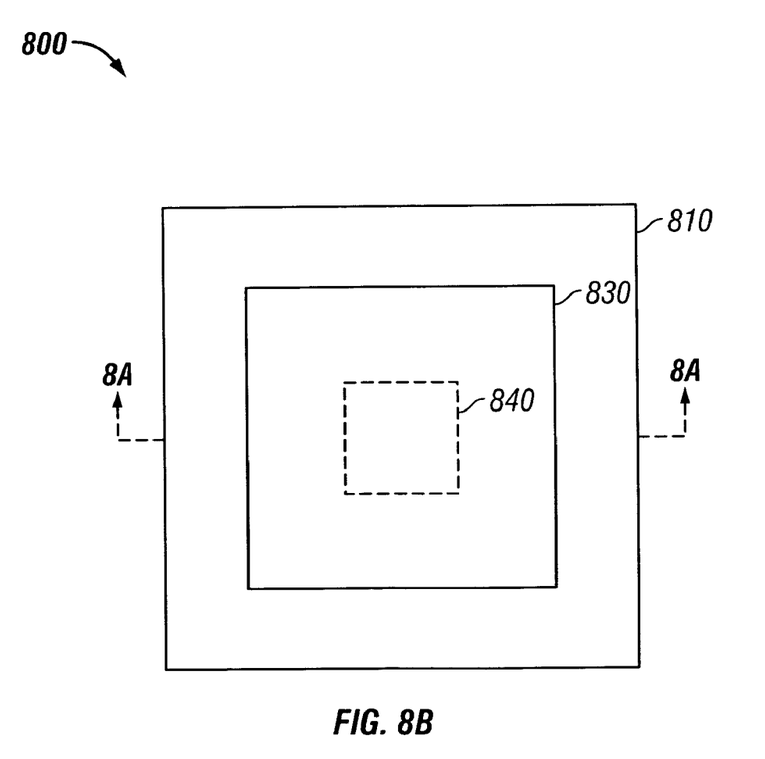

Interferometric modulators typically include moving parts, such as the movable mirrors 14a and 14b, which have a protected space in which to move. A schematic of one embodiment of a MEMS display element 800 comprising an array of interferometric modulators 830 is illustrated in FIGS. 8A and 8B. FIG. 8A is a cross section taken along line 8A-8A of FIG. 8B. As shown in FIGS. 8A and 8B, a MEMS display package 800 includes a transparent substrate 810 and a backplate cover or "cap" 820. An interferometric modulator array 830 (also referred to as "array" herein) is encapsulated within the display package 800. As shown, the backplate 820 and transparent substrate 810 are sealed together to protect the interferometric modulator array 830 from harmful elements in the environment, such as moisture. A covered interfering member 840 is also shown above a portion of the array 830 and containing a sealant (not shown) on its upper surface to seal the backplate 820 to the transparent substrate 810. A method for packaging an interferometric modulator is described in U.S. Provisional Application No. 60/801,542, filed May 17, 2006, the disclosure of which is entirely incorporated herein by reference.

With continued reference to FIGS. 8A and 8B, the interfering member 840 can be any object that can interact (or interfere) with the function or usefulness of the array 830. Interaction between the interfering member and the array can be, e.g., in the form of an electrostatic interaction and/or physical interaction. In the illustrated embodiment, the interfering member 840 is a desiccant.

While the MEMS display package 800 of the illustrated embodiment comprises one interfering member 840, it will be appreciated that multiple interfering members may be included. Additionally, the interfering member 840 can have any shape and configuration. As an example, the interfering member can be shaped triangular, circular, or hexagonal. As another example, the interfering member 840 can circumscribe the array, with a portion of the interfering member being disposed over the array 830.

It will be appreciated that the packages and packaging methods described herein may be used for packaging any MEMS device, including, but not limited to, the interferometric modulators described herein.

As discussed above, the array 830 is configured to reflect light through the transparent substrate 810. Each interferometric modulator in the array 830 includes moving parts, such as the movable mirrors 14a, 14b. The movable mirrors 14a and 14b are delicate and should not come into direct contact with the backplate cover 820 or the interfering member 840. Thus, a gap or cavity 845 is preferably created between the moveable mirrors 14a and 14b and the backplate 820 and/or the interfering member 840. The gap or cavity 845 provides a buffer space for the mechanical parts, such as the movable mirrors 14a and 14b of each interferometric modulator. In preferred embodiments, the gap or cavity is created before the backplate 820 is joined to the transparent substrate 810.

The transparent substrate 810 may be any transparent substance capable of having thin film, MEMS devices built upon it. Such transparent substances include, but are not limited to, glass, plastic, and transparent polymers. Images are displayed through the transparent substrate 810, which serves as an imaging surface.

In accordance with an embodiment, the array 830 is formed on the transparent substrate 810. It will be understood that the fixed mirrors 16a and 16b of each interferometric modulator is adjacent the transparent substrate 810 and the movable mirrors 14a and 14b are formed over the fixed mirrors 16a and 16b such that the movable mirrors 14a and 14b may move within the cavity 845 (see also FIGS. 1 and 7) of the MEMS display package 800 of the embodiment shown in FIGS. 8A and 8B.

To form each interferometric modulator of the array 830, in one embodiment, the transparent substrate 810 is covered with indium tin oxide (ITO), which may be deposited by standard deposition techniques, including chemical vapor deposition (CVD) and sputtering, preferably to a thickness of about 500 Å. A relatively thin layer of chrome may be deposited over the ITO. The ITO/chrome bilayer is then etched and patterned into columns to form the column electrodes 16a, 16b. A layer of silicon dioxide ($SiO_2$) is preferably formed over the ITO/chrome columns to create partially reflective fixed mirrors 16a, 16b. A sacrificial layer of molybdenum (Mo) is then deposited (and later released) over the structure to create a resonant optical cavity between the fixed mirrors 16a, 16b and the movable mirrors 14a, 14b. In other embodiments, this sacrificial layer may be formed of silicon (Si), tungsten (W), or titanium (Ti).

Another mirror layer, in some embodiments formed of aluminum, is deposited over the sacrificial layer to form the movable mirrors 14a, 14b of each interferometric modulator. This mirror layer is deposited and patterned into rows orthogonal to the column electrodes 16a, 16b to create the row/column array described above. In other embodiments, this mirror layer may comprise highly reflective metals, such as, for example, silver (Ag) or gold (Au). Alternatively, this mirror layer may be a stack of metals configured to give the proper optical and mechanical properties.

The sacrificial layer is removed, using a gas etching process, after the movable mirrors 14a, 14b are formed to create the optical cavity between the fixed mirrors 16a, 16b and the movable mirrors 14a, 14b. In an embodiment, this sacrificial layer is removed after the backplate is joined to the transparent substrate through an opening in either the backplate or perimeter seal, as will be described in more detail below. Standard etching techniques may be used to remove the sacrificial layer. The particular release etching will depend on the material to be released. In one embodiment, a fluorine containing etching chemistry, such as, e.g., xenon diflouride ($XeF_2$), is used to remove the sacrificial layer. In another embodiment, the sacrificial layer between the mirrors 16a, 16b, 14a, 14b is removed before the backplate 820 is joined to the transparent substrate 810. The skilled artisan will appreciate that each layer of an interferometric modulator is deposited and patterned using standard deposition techniques and standard photolithographic techniques.

The skilled artisan will understand that the backplate 820 serves a mechanical function, protecting the array 830 from contaminants in the environment. The backplate 820 along with the transparent substrate 810 and covered interfering member 840 prevent mechanical interference, moisture, and contaminant gases from reaching and potentially damaging the array 830 within the display package 800. The backplate 820 may therefore be formed of any suitable material, whether transparent or opaque, conductive or insulating. Suitable materials for the backplate 820 include, but are not limited to, glass (e.g., float, 1737, soda lime), plastic, ceramics, polymers, laminates, and metals and metal foils (e.g., stainless steel (SS302, SS410), Kovar, plated Kovar).

A sealing means or a seal 842 is typically provided to join the transparent substrate 810 and the backplate 820 to encapsulate the array 830, forming the package 800. The seal is typically a semi-hermetic seal, such as a conventional epoxy-based adhesive. In other embodiments, the seal may be Polyisobutylene (PIB), o-rings, polyurethane, thin film metal weld, liquid spin-on glass, solders, glass frit or silica glass mixtures (fired to make a solid glass frit), polymers, or plastics, among other types of seals. In still other embodiment, the seal may be a hermetic seal. Once the backplate 820 and transparent substrate 810 are joined, the seal may be cured and hardened.

In one embodiment having a hermetic seal, the seal 842 is a hermetic barrier that acts as an environmental barrier preventing all air and water vapor from flowing through the seal 842 and entering the display package 800. Suitable materials for a hermetic seal include, but are not limited to, welds, solders, adhesives mixed with molecular sieves, such as a Zeolite. The adhesive component alone may not act as a suitable environmental barrier because it will eventually allow moisture and other contaminants to permeate into the display package 800. Thus, in one embodiment, the display package 800 also includes the covered interfering member 840 which reduces moisture from the interior environment of the package 800. Exemplary desiccants used herein may be a calcium dioxide, strontium oxide (SRO), silica gels, montmorillonite clay (preferably a magnesium aluminum silicate), molecular sieves (zeolites such as $Na_{12}AlO_3SiO_{212}XH_2 0$), or calcium sulfates.

The interfering member 840 may be used to reduce moisture resident within the package 800. Desiccants may be used for packages that have either hermetic or semi-hermetic seals. In a package having a semi-hermetic seal, a desiccant may be used to control moisture moving into the package from the environment. For packages having hermetic seals, desiccants may be provided within the package to absorb any moisture that moves into the package during the manufacturing process.

Desiccant Pattern

Figure 9:
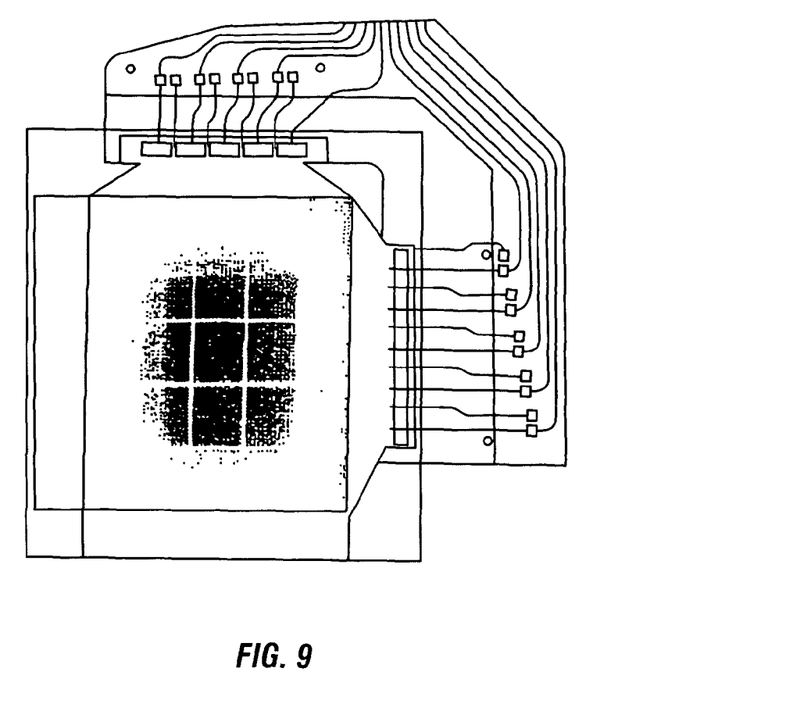
FIG. 9 illustrates an interferometric modulator display, showing a desiccant pattern.

During operation of a MEMS display element, such as the MEMS display package 800 illustrated in FIGS. 8A and 8B, a desiccant pattern may be formed over portions of the array 830 disposed below the desiccant 840. A desiccant pattern for an exemplary MEMS display element is shown in FIG. 9, in which the desiccant pattern appears as a dark rectangular box. While not being bound by any particular theory of operation, the desiccant pattern may be due to interaction between portions of the array and the desiccant 840. Portions of the array 830 not disposed below the desiccant 840 do not display the desiccant pattern.

Figure 10:
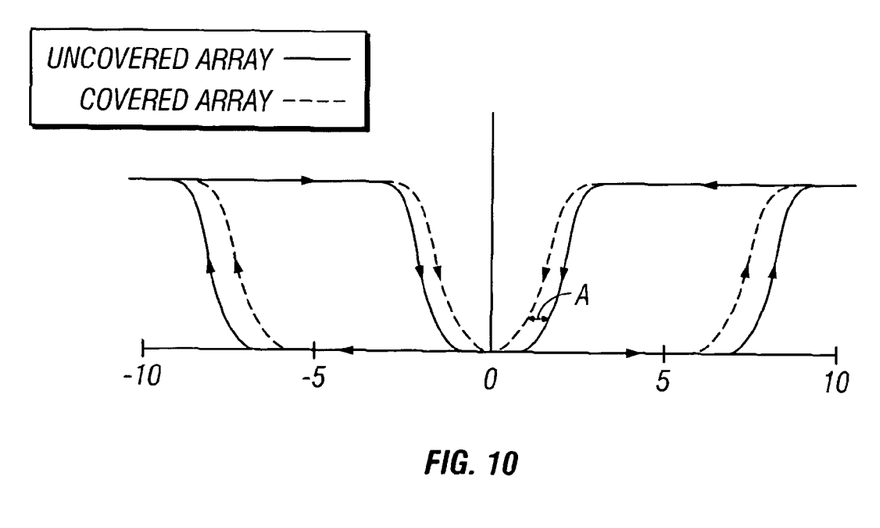
FIG. 10 is a diagram of movable mirror positions versus applied voltage for one exemplary embodiment of an interferometric modulator of FIGS. 8A and 8B.

FIG. 10 shows hysteresis windows for the interferometric modulators adjacent the desiccant (dashed lines) and the interferometric modulators that are not adjacent to the desiccant (solid lines). The hysteresis window of the interferometric modulators that are adjacent the desiccant is shifted to the left or to the right with respect to the hysteresis window of the interferometric modulators that are not adjacent the desiccant. The degree of shifting, herein referred to as "the offset voltage," which is designated by "A," is approximately 0.75 volts in the illustrated embodiment of FIG. 10. This offset voltage illustrate in FIG. 10 has shifted 0.75 volts to the right (positive voltage), for both the positive and negative portions of the hysteresis window. However the offset voltage need not be necessarily 0.75 volts, and it need not be a positive voltage shift. As an example, the offset voltage may be 1 volt or 2 volts, and may be in the positive or negative directions. However, both sides of the hysteresis window will shift in the same direction (either positive (to the right) or negative (to the left)). The skilled artisan will understand that the offset voltage can vary with the degree of interaction.

With all interferometric modulators initially in the actuated state, interferometric modulators adjacent to the desiccant transition to a relaxed state at a time ($t_1$) and interferometric modulators not adjacent the desiccant transition to a relaxed state at a time ($t_2$). Preferably, interferometric modulators within a single display should transition to a relaxed state at approximately the same time, i.e., $\Delta t = t_2 - t_1 \approx 0$, resulting in no desiccant pattern being observed. If the interferometric modulators within a single display have differing hysteresis windows, than the display is not of optimum quality because instructions provided to the array to change states will be carried out at differing times by different modulators. This can lead to a display that does not provide a high quality, sharp picture, because the modulator elements are not transitioning together. It should be realized that the time delay, $\Delta t$, can be between about 1-20 microseconds or preferably between about 5-12 microseconds or more preferably about 6, 7, 8, 9, 10 or 11 microseconds.

In one embodiment of the invention, the desiccant pattern is eliminated by baking (also referred to herein as "annealing") the transparent substrate having the array of interferometric modulators. While not being bound by any particular theory, it appears that baking the formed interferometric modulators desorbs contaminants from the transparent substrate and/or the interferometric modulators. In one embodiment, the MEMS display element is annealed with a backplate attached to the transparent substrate, in which case annealing may desorb contaminants from the transparent substrate, the interferometric modulators and/or the backplate.

Figure 11:
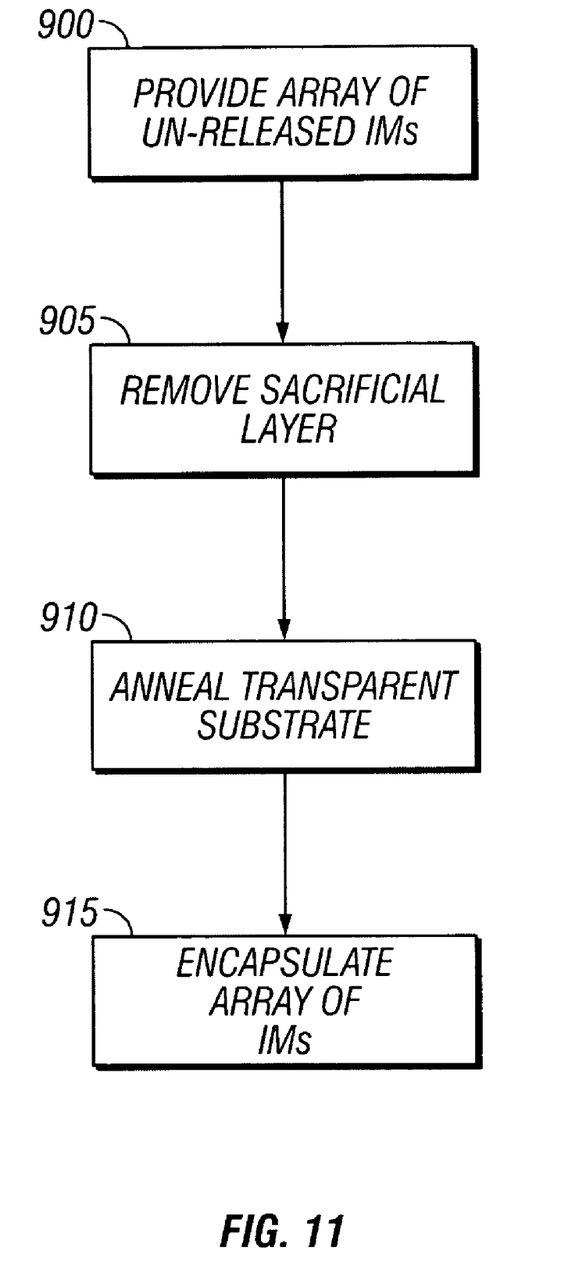
FIG. 11 illustrates a sequence of steps for processing an interferometric modulator, in accordance with preferred embodiments.

FIG. 11 is a flow diagram illustrating one embodiment of a process for manufacturing interferometric modulators by annealing. As shown, a transparent substrate having an array of un-released interferometric modulators is provided at a state 900. The interferometric modulators are released at a state 905 by removing the sacrificial layer via exposure to an etchant, such as a fluorine-containing etchant (e.g., $XeF_2$), as described above. Next, the transparent substrate (which includes the array of IMs) is annealed at a state 910 using predetermined processing conditions selected from the group consisting of annealing temperature and annealing time. In one embodiment the annealing temperature is less than or equal to about 200° C. In another embodiment, the annealing temperature is less than or equal to about 150° C., and in a third embodiment the annealing temperature is less than or equal to about 120° C. The annealing time is preferably between about 1 minute and 24 hours. In another embodiment, the annealing time is between about 10 minutes and 3 hours. The skilled artisan will appreciate that the annealing time can be chosen based on the annealing temperature so that the final product does not display the dynic pattern. As an example, at an annealing temperature of about 120° C., the annealing time may be less than or equal to about 1-3 hours.

Next, following an optional cool-down period, the array of interferometric modulators is encapsulated at a state 915 by sealing a backplate against the transparent substrate to form a package, as described above. In one embodiment, this step entails providing the backplate with desiccant disposed over at least a portion of the array and adjacent to the interferometric modulators. In another embodiment, this step entails providing the backplate without the interfering member.

The annealing state 910 may be performed in a controlled atmosphere, such as an inert gas atmosphere. In some embodiments, annealing is performed in a processing chamber under vacuum generated by a pumping system. In other embodiments, annealing is performed in a chamber (or dry box) purged with an inert gas (e.g., $N_2$, He, Ar) and pumped with a vacuum system, if desired. In still other embodiments, the annealing step is performed in an oven having an inert gas (e.g., $N_2$, He, Ar) atmosphere. As the annealing state 910 may evolve water and other contaminants, sufficient purging and/or pumping is desirable in order to prevent re-adsorption of water and contaminants. Contaminants, also referred to herein as "voltage changing contaminants," include any material that adheres to the transparent substrate and/or interferometric modulators within the array.

Voltage-changing contaminants may interact with desiccant disposed adjacent the array (see FIGS. 8A and 8B) and produce a desiccant pattern. Voltage-changing contaminants may include, without limitation, fluorine-containing compounds, carbon-containing compounds and water. As an example, a contaminant may be fluorine that was introduced to the device by way of the etching chemistry used during the release state 905. The fluorine may be adsorbed onto one or more surfaces of the array and/or the transparent substrate. In such a case, the annealing state 910 evolves molecular fluorine ($F_2$) from the array. As another example, the annealing state 910 may involve water condensed on one or more surfaces of the array and/or the transparent substrate.

In an alternative embodiment, the array of released interferometric modulators is encapsulated with a backplate (with or without an interfering member) prior to annealing. In such a case, one or more holes may be provided in the backplate to allow contaminants to escape during the annealing step. The skilled artisan will appreciate that provision of purging and/or pumping may be desirable to prevent re-adsorption of contaminants.

The transparent substrate may be annealed via resistive, conductive and/or convective heating. As an example, the transparent substrate may be resistively heated via heating elements disposed in a hot plate in contact with the transparent substrate. As another example, the transparent substrate may be radiatively heated with heating lamps in direct view of the reticle. The skilled artisan will understand that various combinations of heating modes can be used to achieve a desired heating rate.

It will be appreciated that the annealing state 910 may include an initial temperature ramp-up and a subsequent temperature ramp-down. The rate at which the transparent substrate is heated (heating rate) and the rate at which the transparent substrate is cooled (cooling rate) can be selected as desired. As an example, the transparent substrate can be heated at 4° C./minute.

By annealing the transparent substrate and the array, as described above, the dynic pattern was found to be eliminated. MEMS display elements that were treated by the aforementioned annealing process were found to have an offset voltage substantially equal to zero.

Example 1

A MEMS display device comprising an array of interferometric modulators ("iMOD array") is fabricated on a substrate as show in FIGS. 8A and 8B. Prior to the sealing of a backplate to the substrate, the iMOD array and the substrate are baked for one hour at 120° C. The backplate and the substrate are then sealed together to encapsulate the iMOD array and protect the iMOD array from harmful environmental elements.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As an example, while preferred embodiments have been described in the context interferometric modulators, it will be appreciated that preferred methods can be applied to any MEMS device. As will be recognized, the present invention may be embodied within a form that does not provide all of the features and benefits set forth herein, as some features may be used or practiced separately from others.

We claim:

1. A method for manufacturing a microelectromechanical (MEMS) display device, comprising:
    providing a transparent substrate having an array of MEMS devices formed thereon;
    identifying at least one MEMS device in the array of MEMS devices exhibiting a desiccant pattern, wherein the desiccant pattern is identified by a time delay between the at least one MEMS device and the remaining MEMS devices within the array when the array of MEMS devices transition from an actuated state to a relaxed state, and if the time delay is between about 1 µs to about 20 µs, baking the at least one MEMS device under predetermined conditions to remove contaminants from the at least one MEMS device, wherein the predetermined conditions comprise a baking time and a baking temperature, and wherein said baking time is between about 10 minutes and about 3 hours; and
    sealing said transparent substrate to a backplate to form a package, wherein the backplate comprises a desiccant.

2. The method of claim 1, wherein said contaminants are configured to activate the at least one MEMS device within said array at a voltage different than other of the MEMS devices within said array.

3. The method of claim 1, wherein said baking time is between about 1 hour and about three hours.

4. The method of claim 1, wherein the baking temperature is less than or equal to about 200° C.

5. The method of claim 4, wherein the baking temperature is less than or equal to about 150° C.

6. The method of claim 5, wherein the baking temperature is less than or equal to about 120° C.

7. The method of claim 1, wherein the desiccant is configured to react with said contaminants so as to alter an activation voltage of the at least one MEMS device in said array.

8. The method of claim 1, wherein the desiccant is configured to react with the contaminants so as to alter a release voltage of the at least one MEMS device in the array.

9. The method of claim 7, wherein said contaminants are configured to react with said desiccant so as to alter a hysteresis window of the at least one MEMS device adjacent to said desiccant.

10. The method of claim 1, wherein said contaminants are selected from the group consisting of fluorine-containing compounds, carbon-containing compounds and water.

11. The method of claim 1, wherein said MEMS devices are interferometric modulators.

12. A method for manufacturing a microelectromechanical (MEMS) display device, comprising:
    providing a transparent substrate with an array of MEMS devices formed thereon;
    sealing said transparent substrate to a backplate to form a package;
    providing a desiccant within the package;
    identifying at least one MEMS device in the array of MEMS devices exhibiting a desiccant pattern, wherein the desiccant pattern is identified by a time delay between the at least one MEMS device and the remaining MEMS devices within the array when the array of MEMS devices transition from an actuated state to a relaxed state; and
    if the time delay is between about 1 µs to about 20 µs, removing voltage-changing contaminants from the at least one MEMS device in the array, wherein removing voltage-changing contaminants comprises baking for between about 10 minutes and about 3 hours.

13. The method of claim 12, wherein baking comprises heating the display device to less than about 120° C.

14. The method of claim 12, wherein the array of MEMS devices comprises an interferometric modulator ("IMOD").

15. The method of claim 12, wherein the voltage-changing contaminants comprise at least one selected from the group consisting of fluorine-containing compounds carbon-containing compounds and water.

16. The method of claim 12, wherein the backplate comprises a desiccant configured to react with the voltage-changing contaminants so as to alter a release voltage of the at least one MEMS device in the array.

17. The method of claim 12, wherein the voltage changing contaminants result in the desiccant pattern.

18. A method for manufacturing a microelectromechanical (MEMS) display device, comprising:
    providing a transparent substrate with an array of MEMS devices formed thereon;
    sealing said transparent substrate to a backplate to form a package, wherein the backplate comprises one or more holes, and wherein a desiccant is located within the package;
    identifying a time delay between at least one MEMS device and the remaining MEMS devices within the array when the array of MEMS devices transition from an actuated state to a relaxed state; and
    after forming the package, if the time delay is between about 1 µs to about 20 µs, heating the package at less than about 200° C. for a predetermined length of time sufficient to allow contaminants in the package to escape through the one or more holes, wherein the predetermined length of time is between about 10 minutes and about 3 hours.

19. The method of claim 18, wherein the MEMS display device comprises an interferometric modulator ("IMOD").

20. The method of claim 18 further comprising sealing the one or more holes.

21. The method of claim 18, wherein the offset voltage in the at least one MEMS device is produced by an interfering member within the package configured to interfere with operation of the at least one MEMS device.

22. The method of claim 21, wherein the interfering member comprises the desiccant.

* * * * *